(12) United States Patent
Downs et al.

(10) Patent No.: US 6,284,199 B1
(45) Date of Patent: Sep. 4, 2001

(54) APPARATUS FOR CONTROL OF MERCURY

(75) Inventors: William Downs, Alliance; Ralph T. Bailey, Uniontown, both of OH (US)

(73) Assignee: McDermott Technology, Inc., New Orleans, LA (US)

( * ) Notice: Subject to any disclaimer, the term of this patent is extended or adjusted under 35 U.S.C. 154(b) by 0 days.

(21) Appl. No.: 09/282,817

(22) Filed: Mar. 31, 1999

(51) Int. Cl.⁷ ................................................ B01J 19/00
(52) U.S. Cl. ................... 422/168; 422/172; 422/188; 422/189; 422/234
(58) Field of Search ................... 423/210, 563; 422/168, 171, 172, 234, 188, 189

(56) References Cited

U.S. PATENT DOCUMENTS

| | | | |
|---|---|---|---|
| 1,897,921 | * 2/1933 | Bacon | 423/563 |
| 3,331,732 | * 7/1967 | Venemark | 162/30 |
| 3,855,387 | 12/1974 | Brockmiller et al. | 423/210 |
| 3,892,837 | 7/1975 | Uchiyama et al. | 423/242 |
| 3,981,972 | 9/1976 | Hishinuma et al. | 423/244 |
| 4,094,879 | 6/1978 | Bates et al. | 260/299 |
| 4,098,697 | 7/1978 | DeAngelis et al. | 210/202 |
| 4,190,709 | 2/1980 | Hodgkin | 521/39 |
| 4,230,183 | 10/1980 | Kalfoglou | 166/274 |
| 4,273,747 | 6/1981 | Rasmussen | 423/210 |
| 4,283,303 | 8/1981 | Ellis | 252/188 |
| 4,285,819 | 8/1981 | Yen et al. | 210/679 |
| 4,377,484 | 3/1983 | Nasrallah | 210/698 |
| 4,578,195 | 3/1986 | Moore et al. | 210/679 |
| 4,857,183 | 8/1989 | Bommer | 210/127 |

(List continued on next page.)

FOREIGN PATENT DOCUMENTS 49-64557 * 6/1974 (JP) ................................... 423/210

OTHER PUBLICATIONS

R. D. Vidic and J. B. McLaughlin, "Uptake of Elemental Mercury Vapors by Activated Carbons," *Journal of the Air and Waste Management Association*, vol. 46, Mar. 1996, pp. 241–250.

J. G. Noblett, Jr. et al, "Control of Air Toxics from Coal–Fired Power Plants Using FPG Technology," presented at the RPRI Second International Conference on Managing Hazardous Air Pollutants, Washington, DC, Jul. 1993, 15 pages.

R. Chang and D. Owens, "Developing Mercury Removal Methods for Power Plants," *EPRI Journal*, Jul./Aug. 1994, pp. 46–49.

K. Felsvang et al., "Air Toxics Control by Spray Dryer Absorption Systems," presented at Power–Gen '92, Orlando, Fl, Nov. 1992, pp. VI–1 thru VI–17.

R. Change and G. R. Offen, Mercury emission control technologies: An EPRI synopsis, *Power Engineering*, Nov. 1995, pp. 51–57.

(List continued on next page.)

Primary Examiner—Steven P. Griffin
Assistant Examiner—Timothy C Vanoy
(74) Attorney, Agent, or Firm—Eric Marich; R. C. Baraona

(57) ABSTRACT

A method and apparatus for reducing mercury in industrial gases such as the flue gas produced by the combustion of fossil fuels such as coal adds hydrogen sulfide to the flue gas in or just before a scrubber of the industrial process which contains the wet scrubber. The method and apparatus of the present invention is applicable to installations employing either wet or dry scrubber flue gas desulfurization systems. The present invention uses kraft green liquor as a source for hydrogen sulfide and/or the injection of mineral acids into the green liquor to release vaporous hydrogen sulfide in order to form mercury sulfide solids.

19 Claims, 5 Drawing Sheets

U.S. PATENT DOCUMENTS

| | | | |
|---|---|---|---|
| 4,889,698 | 12/1989 | Moller et al. | 423/210 |
| 4,889,701 | 12/1989 | Jones et al. | 423/220 |
| 4,975,264 | 12/1990 | Franken | 423/522 |
| 5,139,982 | 8/1992 | Ayala et al. | 502/182 |
| 5,168,065 | 12/1992 | Jankura et al. | 436/55 |
| 5,238,665 | 8/1993 | Lerner | 423/240 |
| 5,246,471 | 9/1993 | Bhat et al. | 55/223 |
| 5,308,509 | 5/1994 | Bhat et al. | 210/770 |
| 5,354,363 | 10/1994 | Brown, Jr. et al. | 95/134 |
| 5,405,593 | 4/1995 | Knudson | 423/244.03 |
| 5,459,040 | 10/1995 | Hammock et al. | 435/7.1 |
| 5,500,196 | 3/1996 | Rogers et al. | 423/242.1 |
| 5,520,897 | 5/1996 | Rogers et al. | 423/242.1 |
| 5,564,105 | 10/1996 | Alvino et al. | 588/20 |
| 5,599,508 * | 2/1997 | Martinelli et al. | 422/169 |
| 5,622,996 | 4/1997 | Fish | 521/33 |
| 5,672,323 | 9/1997 | Bhat et al. | 422/172 |
| 5,795,548 | 8/1998 | Madden et al. | 422/171 |
| 5,827,352 | 10/1998 | Altman et al. | 95/58 |
| 5,834,525 | 11/1998 | Fish | 521/33 |

OTHER PUBLICATIONS

"Emission Factors Handbook: Guidelines for Estimating Trace Substance Emissions from Fossil Fuel Steam Electric Plants," *EPRI*, TR–105611s, Nov. 1995, pages: Cover, Report Summary, 2, 2–11, 2–12, and 2–13.

Advertisement by The Dow Chemical Company, Properties of EDTA, DTPA, HEDTA, and NTA, 1974, 2 pages.

E. H. Hall, Status Report from Battelle Memorial Institute, Columbus Ohio, "Mercury Emissions and Controls," May 1, 1994, 94TEC–1, 49 pages.

R. Meu, "The Fate of Mercury in Coal–Fired Power Plants and the Influence of Wet Flue–Gas Desulphurization," *Water, Air and Soil Pollution*, 56:21–33, 1991, pp. 21–29.

R. Gleiser et al., "Mercury Emission Reduction Using Activated Carbon with Spray Dryer Flue Gas Desulfurization," presented at 36th Annual Meeting American Power Conference, Chicago, Apr. 25–27, 1994, pp. 452–457.

R. Gleiser et al, "Control of Mercury from MSW Combustors by Spray Dryer Absorption Systems and Activated Carbon Injection," MSW Conference Proceedings, Williamsburg, VA, 1993, pp. 106–122.

J. Peterson et al., "Mercury Removal by Wet Limestone FGD Systems: EPRI HSTC Test Results," 94–RP114B.01, presented at the 87th Annual Meeting & Exhibition of Air & Waste Management Association, Cincinnati, Ohio, Jun. 19–24, 1994, pp. 1–16.

R. Chang, et al., "Pilot Scale Evaluation of Activated Carbon for the Removal of Mercury at Coal–Fired Utility Power Plants," presented at the 2nd International Hazard Pollution Management, Washington, DC, Jul. 13–15, 1993, pp. 1–17.

B. K. Gullett, et al., –"Bench–Scale Sorption and Desorption of Mercury with Activated Carbon," presented at International Conference MWC, Williamsburg, VA, Mar. 30–Apr. 2, 1993, 8 pages.

A. Licata et al., "An Economic Alternative to Controlling Acid Gases, Mercury and Dioxin from MWCs," 94–MP17.06, presented at the 87th Annual Meeting & Exhibition for Air & Waste Management Association, Cincinnati, Ohio, Jun. 19–24, 1994, pp. 1–21.

R. Chang et al., "Sorbent Injection for Flue Gas Mercury Control," 94–WA68A.01, presented at the Air & Waste Management Association Conference, Cincinnati, Ohio, Jun. 1994, 13 pages.

C. Jones, "Consensus on air toxics eludes industry to date," *Power*, Oct. 1994, pp. 51–52, 55–56, 58–59.

J. R. Morency, "Control of Mercury in Fossil Fuel–Fired Power Generation," presented at DOE Contractors Meeting, Pittsburgh, PA, Jul. 21, 1994, pp. 1–7.

*Steam/its generation and use*, 40th Edition, The Babcock & Wilcox Company, ©1992, pages:cover, ii, 35–1 thru 35–16.

K. E. Redinger et al., "Mercury Emissions Control in RGD Systems," presented at the EPRI/DOE/EPA Combined Utility Air Pollutant Control Symposium, Washington, DC, Aug. 25–29, 1997, 17 pages.

M. J. Holmes, et al., "Advanced Emissions Control Development Program, " presented at the Advanced Coal–Based Power and Environmental Systems '98 Conference, Morgantown, West VA, Jul. 21–23, 1998, 16 pages.

G. A. Farthing et al., "B&W's Advanced Emissions Control Development Program," presented at the 20th International Technical Conference on Coal Utilization & Fuel Systems, Clearwater, Florida, Mar. 20–23, 1995, 12 pages.

K. E. Redinger and A. P. Evans, "Mercury Speciation and Emissions Control in FGD Systems," presented at the 22nd International Technical Conference on Coal Utilization & Fuel Systems, Mar. 17–20, 1997.

M. J. Holmes et al., "Control of Mercury in Conventional Flue Gas Emissions Control Systems,"presented at the Managing Hazardous Air Pollutants Conference, Washington, DC, Nov. 12–14, 1997, 17 pages.

K. E. Redinger et al., "Mercury Emissions Control in RGD Systems," presented at the EPRI/DOE/EPA Combined Utility Air Pollutant Control Symposium, Washington DC, Aug. 25–29, 1997, pp. 1–17.

C. D. Livengood et al., "Improved Mercury Control in Wet Scrubbing Through Modified Speciation," presented at the EPRI/DOE/EPA Combined Utility Air Pollutant Control Symposium, Washington, DC, Aug. 25–29, 1997, 16 pp.

B. L. Jackson and M. S. DeVito, "Major Findings and Results from Comprehensive Assessment of Emissions from Two Coal–Fired Power Plants," U.S. Dept. of Energy, PETC, Tenth Annual Coal Preparation, Utilization and Environmental Contractor's Conference, Proceedings, vol. 1, Jul. 18–21, 1994, pp. 275–285.

* cited by examiner

APPARATUS FOR CONTROL OF MERCURY

The subject matter of the present invention was developed under a research contract with the U.S. Department of Energy (DOE), Contract No. DE-FC22-94PC94251, and under a grant agreement with the Ohio Coal Development Office (OCDO), Grant Agreement No. CDO/D-922-13. The governments of the United States and Ohio have certain rights in the invention.

FIELD AND BACKGROUND OF THE INVENTION

The present invention relates generally to the field of combustion and flue gas cleanup methods and apparatus and, in particular, to a new and useful method and apparatus for removing mercury from the flue gases generated during the combustion of fossil fuels such as coal, or solid wastes, through the use of hydrogen sulfide.

In recent years, the U.S. Department of Energy (DOE) and the U.S. Environmental Protection Agency (EPA) have supported research to measure and control the emissions of Hazardous Air Pollutants (HAPs) from coal-fired utility boilers and waste to energy plants. The initial results of several research projects showed that the emissions of heavy metals and volatile organic carbons (VOCs) are very low, except for mercury (Hg). Unlike most of the other metals, most of the mercury remains in the vapor phase and does not condense onto fly ash particles at temperatures typically used in electrostatic precipitators and fabric filters. Therefore, it cannot be collected and disposed of along with fly ash like the other metals. To complicate matters, mercury can exist in its oxidized ($Hg^{+2}$) form, principally as mercuric chloride, ($HgCl_2$), or in its elemental ($Hg^0$) form as vaporous metallic mercury. The relative amount of each species appears to depend on several factors such as fuel type, boiler combustion efficiency, the type of particulate collector installed, and various other factors.

The search for industrially acceptable methods for the capture of mercury from industrial flue gases has included a significant effort to determine how much mercury can be removed by existing, conventional air pollution control equipment. One device used in air pollution control is the wet scrubber, which is designed for the capture of sulfur oxides and other acid gases. Tests have been performed on several commercial scale and pilot scale wet scrubbers. These tests have produced some expected and some surprising results. It was generally expected that the oxidized mercury would be easily captured and the elemental mercury would be difficult to capture. These expectations were based on the high solubility of mercuric chloride in water and the very low solubility of elemental mercury in water. This expectation was generally fulfilled.

The surprising result concerned elemental mercury. Repeated tests during which the concentration of elemental mercury in the flue gas was measured revealed that more elemental mercury was leaving the wet scrubber than was entering.

One postulate proposed to explain the cause of the elemental mercury generation in the wet scrubber is described for example, by the following general reactions:

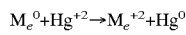

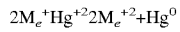

$M_e$ is any number of transition metals such as Fe, Mn, Co, Sn, . . .

Transition metal ions are generally present in wet scrubber slurries as impurities in the industrial applications of concern. Thus, as the mercuric chloride is absorbed, a portion reacts with and becomes reduced by trace levels of transition metals and metal ions and because of its low solubility the elemental mercury is stripped from the liquid and returned to the flue gas.

Most of the recent efforts to capture and remove mercury from the flue gas produced by coal-fired units have concentrated on gas-phase reactions with introduced reagents such as activated carbon.

The subject of mercury emissions by the utility and waste to energy industries is a new area being investigated by both the DOE and EPA.

SUMMARY OF THE INVENTION

The present invention provides a means in the wet scrubber to rapidly precipitate the oxidized mercury at the gas/liquid interface in the wet scrubber before it can be reduced by the transition metals. One of the most insoluble forms of mercury is mercuric sulfide, which in mineral form is cinnabar. One means for supplying a source of sulfide for the oxidized mercury to react with is hydrogen sulfide. Thus, at the gas/liquid interface in the scrubber, the following reaction is proposed for the absorption and precipitation of ionized (oxidized) mercury:

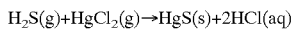

HgS has a solubility product of $3 \times 10^{-52}$ and therefore precipitates essentially completely. There is good reason to expect that the precipitation reaction proceeds faster than the reduction reactions. Specifically, in the case of the precipitation reaction, both reactants are well mixed in the gas phase. Thus, as they diffuse from the gas to the gas/liquid interface both reactants can react instantly at that interface. By contrast, the reduction reactions require that the reactants, i.e., the $Hg^{+2}$ and the transition metal ion, diff-use in the liquid phase to a reaction plane in the liquid. Liquid phase diffusion is orders of magnitude slower than gas phase diffusion. Therefore, the oxidized mercury will rapidly precipitate as cinnabar in the scrubber and thereby prevent the reduction of that mercury back to vaporous elemental mercury. The precipitation of mercury as cinnabar has a distinct advantage over other mercury sequestering methods in that it converts mercury to a very insoluble form. In this way, the mercury should be inert and effectively removed from the food chain.

Accordingly, one aspect of the present invention is drawn to an improvement in a method using a wet scrubber for receiving and scrubbing an industrial gas containing mercury with a wet scrubber slurry, the improvement comprising: adding hydrogen sulfide to the industrial gas; and scrubbing the industrial gas in the wet scrubber. The method according to the present invention is particularly suited to the task of reducing mercury emissions in an industrial process which burns coal in a furnace to produce an exhaust flue gas, including conveying the exhaust flue gas through a dust collector and adding hydrogen sulfide to the flue gas before it enters the wet scrubber, or within the wet scrubber.

Another aspect of the present invention is drawn to an apparatus using a wet scrubber for receiving and scrubbing an industrial gas containing mercury with a wet scrubber slurry, and particularly the improvement comprising: means for generating hydrogen sulfide; and means for supplying the hydrogen sulfide to the industrial gas upstream of the wet scrubber. The present invention is again particularly suited to utility installations which burn fossil fuels such as coal, or solid wastes, and which use, in addition to the wet scrubber, an electrostatic precipitator or a fabric filter and other conventional components for reducing emissions to the atmosphere.

Particularly, the present invention contemplates provision of a hydrogen sulfide generating system which produces the hydrogen sulfide from a reaction of adding an acid to a solution of aqueous sodium and/or potassium sulfide to generate the hydrogen sulfide. Advantageously, the hydrogen sulfide generating system may use equipment and methods wherein the acid is added to green liquor from the Kraft pulping process to generate the hydrogen sulfide.

The system has an inherent safety advantage in that no gas phase $H_2S$ is accumulated or stored. All $H_2S$ that is generated is immediately injected.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENTS

Figure 1:
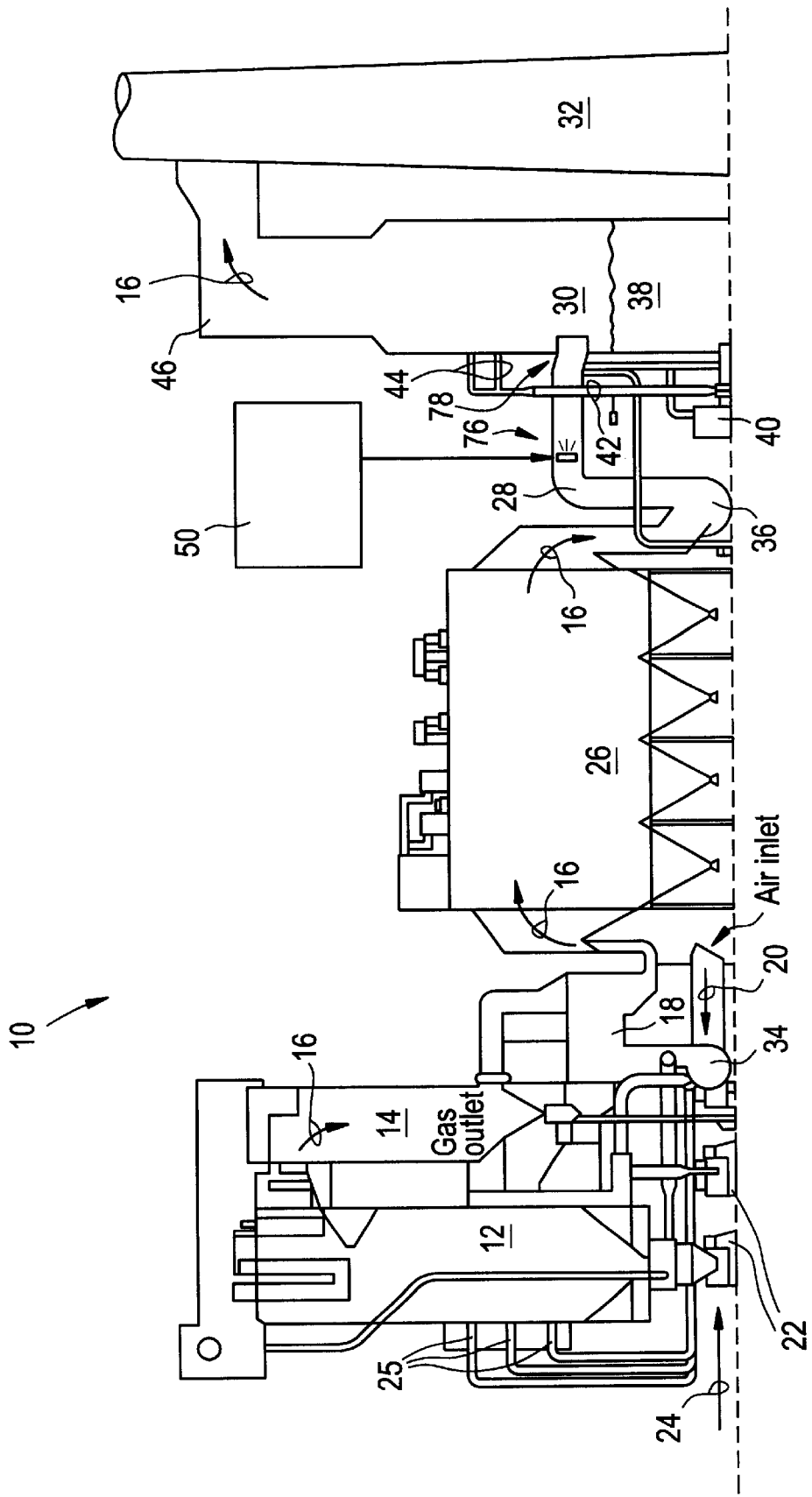
FIG. 1 is an illustration of the present invention as applied to a coal-fired utility boiler installation of the type used by utilities in the generation of electric power.

Referring to the drawings generally, wherein like reference numerals designate the same or functionally similar elements throughout the several drawings, and to FIG. 1 in particular, FIG. 1 illustrates a coal-fired utility boiler installation of the type used by utilities in the generation of electric power, generally designated 10, and which represents one type of industrial process to which the present invention is applicable. In its broadest form, the present invention comprises a method for removing mercury from the flue gas generated during the combustion of fossil fuels or solid wastes through the use of trace amounts of hydrogen sulfide. Of course, while the aforementioned coal-fired utility boiler installations are but one example, and the method of the present invention will likely first find commercial application to the removal of mercury from the flue gases produced by such utility boiler installations which combust such fossil fuels, any industrial process using a wet scrubber type of absorber module to purify such flue gases may benefit. Such processes could include incineration plants, waste to energy plants, or other industrial processes which generate gaseous products containing mercury. Thus for the sake of convenience, the terms industrial gas, flue gas, or simply gas will be used in the following discussion to refer to any gas from an industrial process and from which an objectionable component, such as mercury, is to be removed.

As will be described infra, an alternate embodiment of the present invention involves methods and apparatus for the addition of trace amounts of hydrogen sulfide to industrial gases which are treated by dry scrubber flue gas desulfurization systems. Thus, while the majority of the following description is presented in the context of the present invention as being applied to wet scrubber systems, it will be appreciated that the present invention is not limited thereto. Further, since both wet and dry scrubbers remove sulfur species from the flue gas by introduction of an alkali sorbent, some common terminology may be used as appropriate for the sake of convenience. In the case of wet scrubbers, the alkali sorbent can be provided as an aqueous alkali solution or slurry; in dry scrubbers, the alkali sorbent is usually provided as an aqueous alkali slurry. Thus, for the sake of convenience in the following description, the term aqueous alkali reagent will be used to encompass both aqueous alkali solutions and/or aqueous alkali slurries as appropriate to the type of scrubber means being used.

As illustrated in FIG. 1, and proceeding in the direction of flue gas flow generated during the combustion process, the boiler installation 10 includes a furnace 12 having a gas outlet 14 which conveys flue gases, generally designated 16, to an air heater 18 used to preheat incoming air 20 for combustion. Pulverizers 22 grind a fossil fuel 24 (e.g., coal) to a desired fineness and the pulverized coal 24 is conveyed via burners 25 into the furnace 12 where it is burned to release heat used to generate steam for use by a steam turbine-electric generator (not shown). Flue gas 16 produced by the combustion process are conveyed through the gas outlet 14 to the air heater 18 and thence to various types of downstream flue gas cleanup equipment. The flue gas cleanup equipment may comprise a fabric filter or, as shown, an electrostatic precipitator (ESP) 26 which removes particulates from the flue gas 16. A flue 28 downstream of the ESP 26 conveys the flue gas 16 to a wet scrubber absorber module 30 which is used to remove sulfur dioxide and other contaminants from the flue gas 16. $H_2S$ generation system 50 is optimally provided along flue 28. Generation system 50 permits the injection of $H_2S$ not flue 17 via injection apparatus 76. Both generation system 50 and injection apparatus 76 are described in greater detail infra. Flue gas 16 exiting from the wet scrubber absorber module or, simply, the wet scrubber 30, is conveyed to a stack 32 and exhausted to atmosphere. Forced draft fans 34 and induced draft fans 36 are used to propel the air 20, fuel 24, and flue gases 16 through the installation 10. For further details of various aspects of such installations 10, the reader is referred to *STEAM its generation and use*, 40th Ed., Stultz and Kitto, Eds., Copyright© 1992 The Babcock & Wilcox Company, particularly to Chapter 35—Sulfur Dioxide Control, the text of which is hereby incorporated by reference as though fully set forth herein. While the aforementioned *STEAM* reference contains a description of one form of wet scrubber 30 produced by The Babcock & Wilcox Company (B&W) and to which the present invention is applicable, the present invention is not limited to such B&W wet scrubber designs.

Persons skilled in the art will appreciate that the principles of the present invention apply equally well to other types of wet scrubber designs, available from other manufacturers.

The wet scrubber 30 contains, in a lower portion thereof, an inventory of wet scrubber slurry 38. During operation of the wet scrubber 30, recirculation pumps 40 pump and recirculate the wet scrubber slurry 38 up through pipes 42 and into absorber spray headers 44 located in an upper portion of the wet scrubber 30. The wet scrubber slurry 38 is sprayed counter currently into the flue gas 16 where it absorbs S02. The wet scrubber slurry 38 falls down through various devices and drains back into the lower portion of the wet scrubber 30. The scrubbed flue gas 16 then exits from a wet scrubber outlet 46 and is eventually conveyed to the stack 32.

Figure 2:
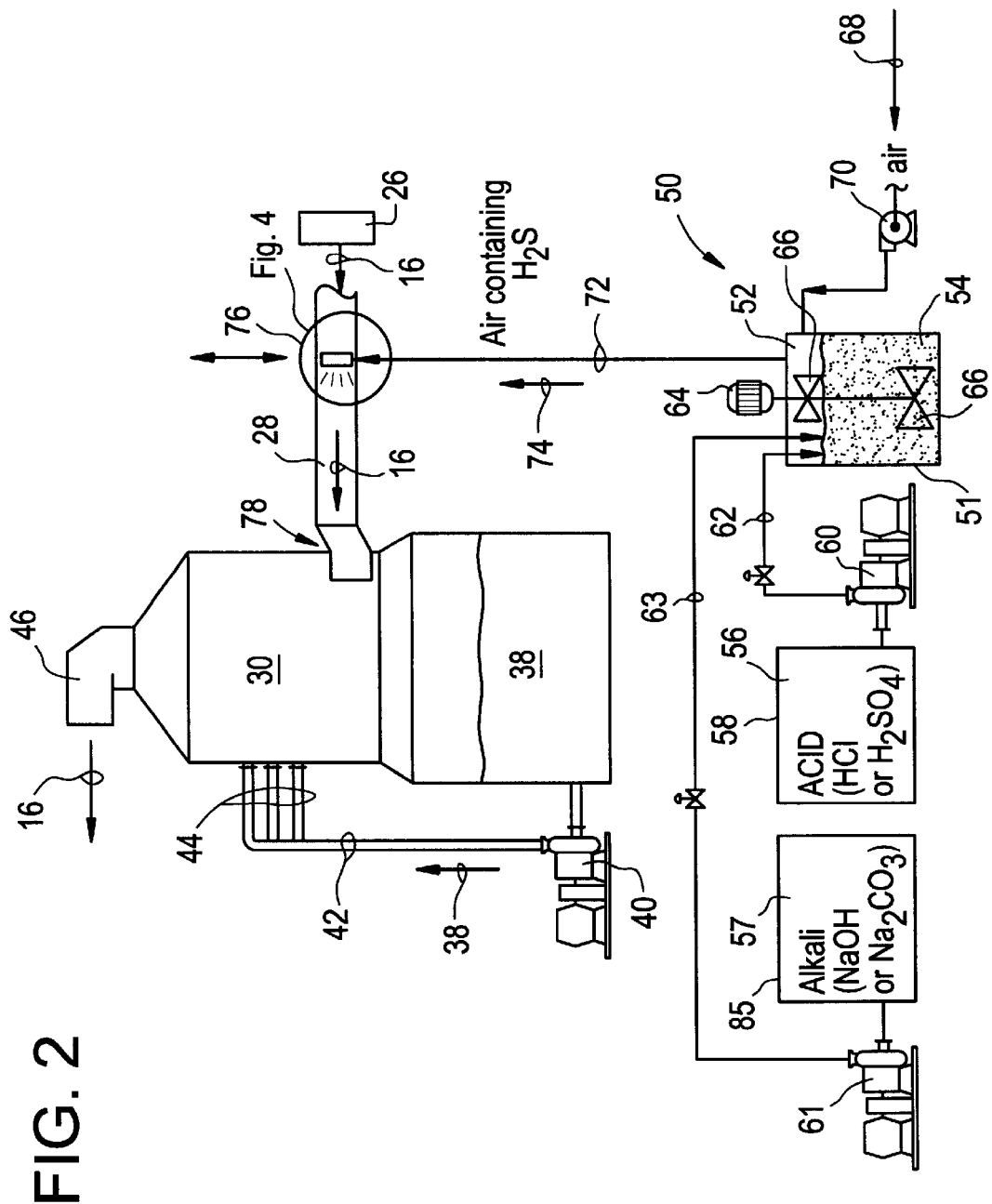
FIG. 2 is an illustration of a hydrogen sulfide $H_2S$ generation system according to the present invention as particularly applied to a wet scrubber of FIG. 1.

Referring now to FIG. 2 in particular, there is shown an embodiment of a system for accomplishing the method of injecting small amounts of $H_2S$ into flue gas for mercury removal according to the present invention. ESp 26, wet scrubber slurry 38, recirculation pumps 40, absorber spray headers 44 and wet scrubber outlet 46 are provided in a similar fashion as described supra. An $H_2S$ generation system, generally referred to as 50, is provided and includes a well-stirred tank containing a liquid section 54 comprising sodium and/or potassium sulfide and a gas section 52 where air and $H_2S$ are mixed and the mixture 74 of air and $H_2S$ is transferred to an injection apparatus 76, described infta. The $H_2S$ vapor pressure in the tank 51 is controlled by pH. The pH in the tank 51 liquid solution 54 is controlled by the addition of a strong mineral acid 56, such as hydrochloric or sulfuric acid (HCl or $H_2SO_4$) from a tank or container 58, or by the addition of an alkali solution 57 such as sodium carbonate or sodium hydroxide (NaOH or $Na_2CO_3$) from a tank or container 85. The acid is added to lower the pH and increase the $H_2S$ vapor pressure in tank 51. The alkali is added to raise the pH and lower the $H_2S$ vapor pressure in tank 51. The $H_2S$ produced is immediately transported to the injection system 76. This is an inherent safety feature since no gaseous $H_2S$ is allowed to accumulate. Stirring or mixing means, advantageously comprising a motor 64 and driven stirring shaft with two paddles 66, keep the tank sections 52 and 54 well stirred. As a result, the constituents in the liquid zone 54 are well mixed to yield the $H_2S$ at the desired vapor pressure and the air 68 and generated $H_2S$ are well mixed in the gas section 52. Pumping means 60 conveys the mineral acid 56 to the tank 51 via line 62; pumping means 61 conveys the alkali solution 57 to the tank 51 via line 63. Suitable control valves in lines 62 and 63 would be used as needed to control the flow of acid 56 and alkali 57.

Air 68 is provided by fan (blower or compressor) means 70 into the upper section 52 of tank 51 where it mixes with the $H_2S$. Line 72 from the upper section of the tank 51 conveys the mixture 74 of air and $H_2S$ to an injection system 76 in flue 28 for injecting the $H_2S$-air mixture 74 into the flue gas 16.

The rate of hydrogen sulfide generation is controlled by the rate of acid addition. The rate of air 68 provided into the tank 52 is controlled by the fan means 70 that supplies the air 68 in the quantity and at the pressure necessary for rapid mixing of the $H_2S$-air mixture 74 with the flue gas 16 at an inlet 78 to the wet scrubber 30.

Figure 4:
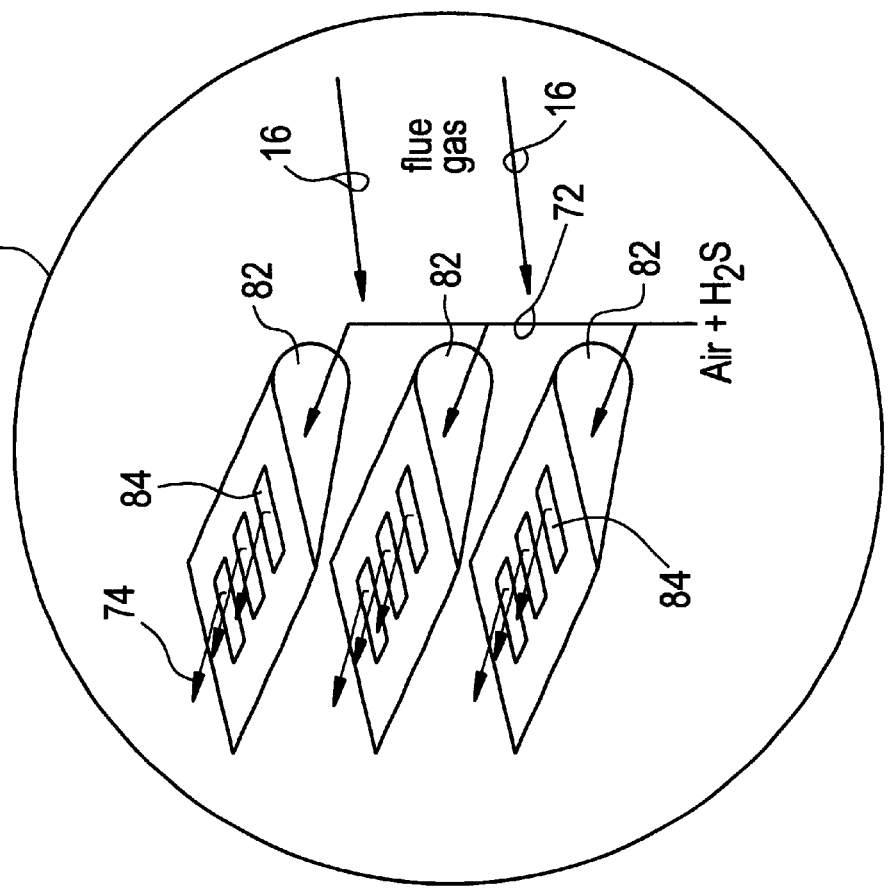
FIG. 4 is an enlarged partial view of the circled area in FIG. 2, illustrating another embodiment of a system for injecting $H_2S$ into flue gases for mercury control according to the present invention.
Figure 3:
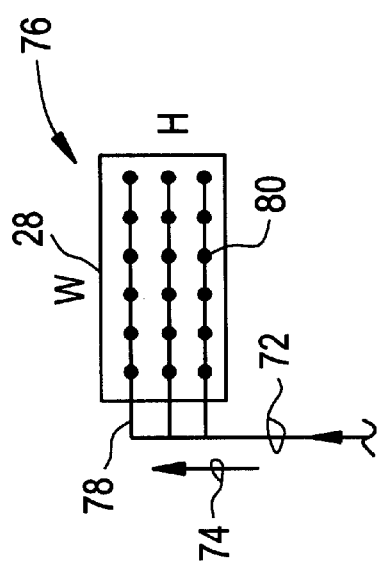
FIG. 3 is an enlarged partial view of the circled area in FIG. 2, illustrating one embodiment of a system for injecting $H_2S$ into flue gases for mercury control according to the present invention.

The $H_2S$-air injection system 76 can comprise one or more pipes 78 arranged in a simple grid, each of the pipes 78 being provided with a plurality of apertures 80, the pipes 78 arranged across a width W and height H of flue 28, as shown in FIG. 3. Alternatively, the $H_2S$-air injection system 76 could utilize a more sophisticated structure incorporating air foil mixing technology such as that illustrated in FIG. 4. In the system of FIG. 4, one or more air foils 82 would be provided, each having a plurality of slots or apertures 84 for introducing the $H_2S$-air mixture 74 into the flue gas 16 as the flue gas 16 flows across the air foils 82. In either case, the flue gas 16 flowing past the pipes 78 or air foils 82 picks up the $H_2S$-air mixture 74 and conveys it to the wet scrubber 30 to increase the $H_2S$ content in the flue gas 16 to a desired level, preferably between about 0.05 and 10 ppm, or more preferably 2 ppm or below.

Figure 5:
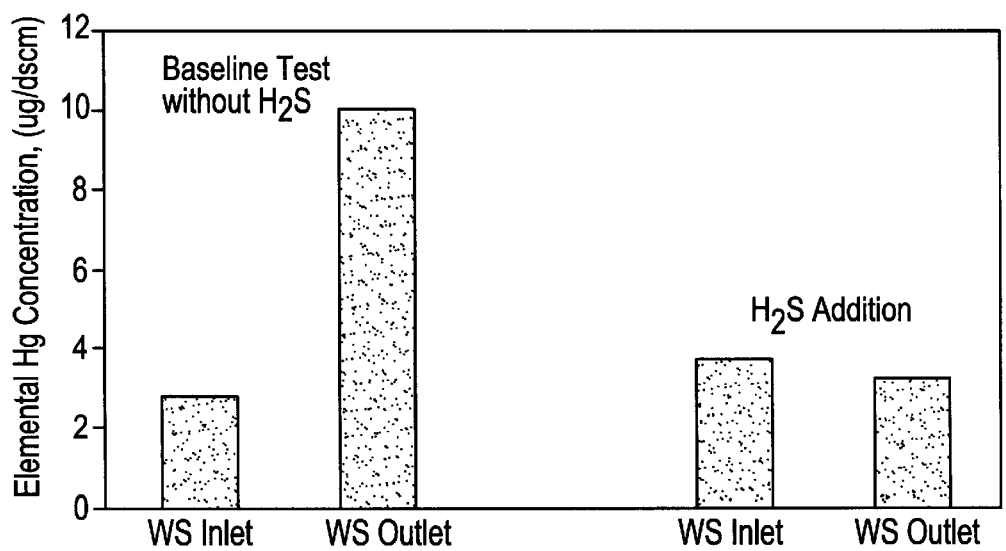
FIG. 5 is a chart illustrating the results of tests comparing performance without $H_2S$ injection to performance with $H_2S$ injection.

FIG. 5 depicts test results obtained when a pilot scale wet scrubber was used to capture mercury. In FIG. 5, the legends "WS Inlet" and "WS Outlet" refer to conditions at the wet scrubber 30 inlet and outlet, respectively. The left two bars represent baseline conditions of the elemental mercury content of the flue gas 16 at the wet scrubber inlet and outlet, without $H_2S$ addition. The large increase in elemental mercury at the wet scrubber outlet is due to the chemical reduction of oxidized mercury within the wet scrubber 30 according to the reactions previously noted. The right two bars represent the improved performance achieved when $H_2S$ was injected at a concentration of about two parts per million (2 ppm). As shown, the chemical reduction of oxidized mercury to elemental mercury was completely prevented.

Figure 6:
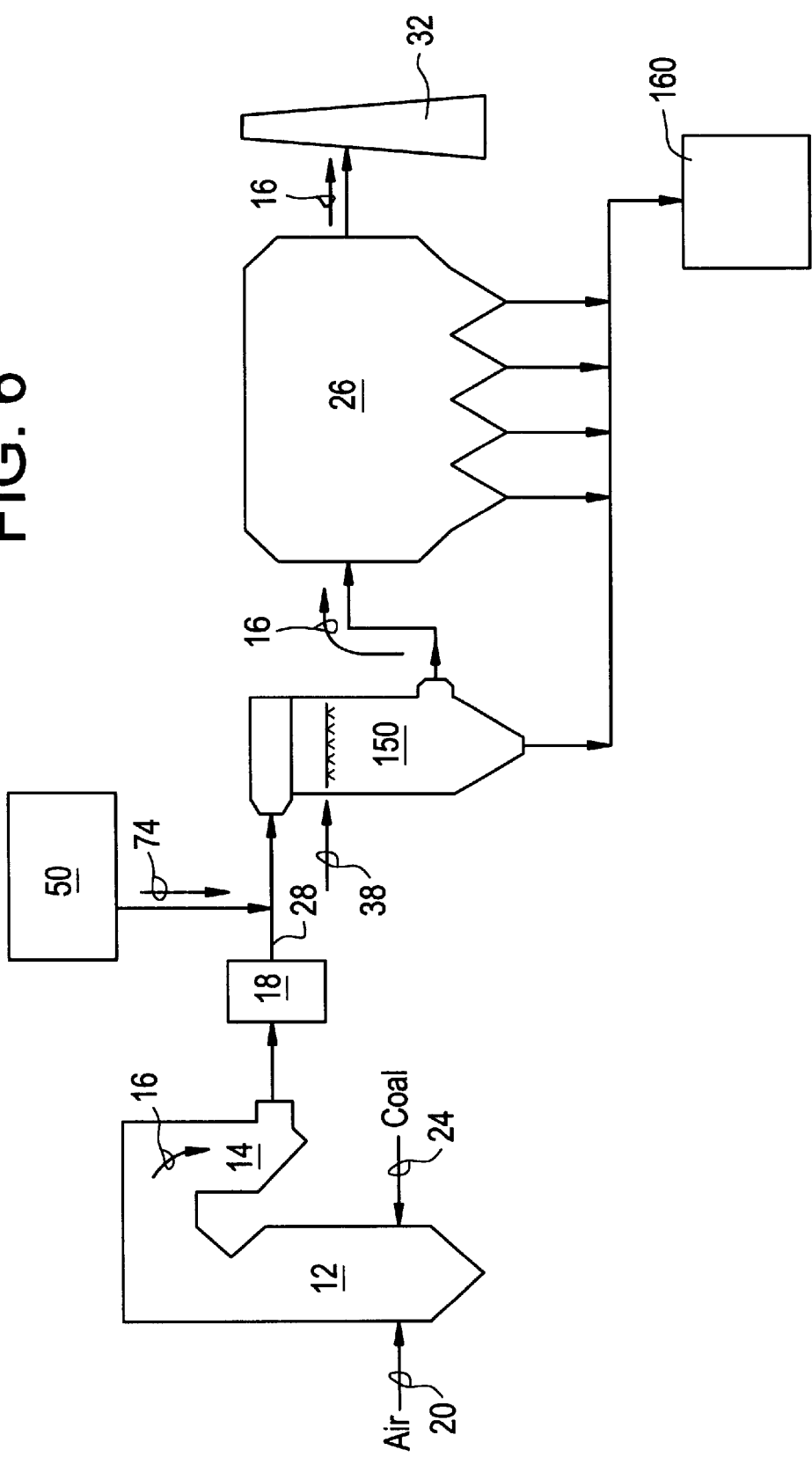
FIG. 6 is an illustration of the present invention as applied to a coal-fired utility boiler installation of the type used by utilities in the generation of electric power which employs a dry scrubber flue gas desulfurization system.

As described earlier and as illustrated in FIG. 6, the present invention is also applicable to combustion systems employing dry scrubbers for flue gas desulfurization. Again, like reference numerals designate the same or functionally similar parts, including installation 10, forced draft fans 34 and induced draft fans 36. Flue gas 16 produced by the combustion process are conveyed through the gas outlet 14 to the air heater 18 and thence to various types of downstream flue gas cleanup equipment. A flue 28 conveys the flue gas 16 to a dry scrubber absorber module 150 which is used to remove sulfur dioxide and other contaminants from the flue gas 16. Flue gas 16 exiting from the dry scrubber 150 is conveyed to a fabric filter or, as shown, an electrostatic precipitator (ESP) 26 which removes particulates from the flue gas 16 and then the flue gas 16 is conveyed to a stack 32 and exhausted to atmosphere. Forced draft fans 34 and induced draft fan 36 are used to propel the air 20, fuel 24, and flue gases 16 through the installation 10 as before. Waste from ESP 26 and dry scrubber 150 are removed via waste disposal system 160, or other means well known to those skilled in the art.

Advantages of the present invention include the fact that the cost of control of mercury emissions according to the present invention is relatively insignificant compared to the costs for control of other hazardous air pollutants. Further, the amount of $H_2S$ required should be below the threshold odor level. The cost and operating expenses of a system as depicted in FIG. 2 should be substantially less compared to any other system proposed to date. According to a preferred embodiment of the present invention, one source of the sodium sulfide used to generate the $H_2S$ can comprise green liquor, an intermediate chemical used in the Kraft pulp and paper industry and which is readily available from pulp and paper companies. As is known to those skilled in the art, green liquor consists of an aqueous mixture of sodium sulfide and sodium carbonate. Green liquor is relatively easy and safe to handle and should be widely available.

According to the present invention, the mercury in the flue gas 16 ends up as mercuric sulfide (also known as cinnabar). This is the chemical form that mercury is most often found in nature and is probably the most desirable chemical form to sequester mercury. Much of the mercury in this form is present as a fine particulate in the scrubber slurry and for that reason, it is possible to separate much of the mercury from the gypsum crystals.

While a specific embodiment of the invention has been shown and described in detail to illustrate the application of the principles of the invention, it will be understood that the invention may be embodied otherwise without departing from such principles. By way of example and not limitation, while the principles of the present invention were described as being particularly applicable to fossil-fired boiler installations, it will be appreciated by those skilled in the art that the present invention can be used to remove mercury from industrial gases produced by refuse incinerators, refuse boilers, hazardous waste incinerators, or ore roasters.

We claim:

1. In an apparatus using a scrubber for receiving and scrubbing an industrial gas containing mercury with an aqueous alkali reagent, the improvement comprising: means for generating hydrogen sulfide including a tank means for providing an aqueious solution comprising sodium sulfide or an aqueous solution comprising potassium sulfide, an acid supply means for providing acid into the aqueous solution to generate hydrogen sulfide and means for supplying air to said tank means to produce a mixture of air and hydrogen sulfide; and means for supplying the mixture of air and hydrogen sulfide to the industrial gas upstream of the scrubber.

2. The apparatus according to claim 1, comprising means for conveying the mixture of hydrogen sulfide and air from said tank means to a flue conveying said industrial gas.

3. The apparatus according to claim 2, comprising a hydrogen sulfide/air injection system for introducing the mixture of hydrogen sulfide and air into the industrial gas.

4. The apparatus according to claim 3, wherein the hydrogen sulfide/air injection system comprises a plurality of pipes having apertures therein for discharging the mixture into the industrial gas.

5. The apparatus according to claim 3, wherein the hydrogen sulfide/air injection system comprises a plurality of air foils having apertures therein for discharging the mixture into the industrial gas.

6. The apparatus according to claim 1, wherein the means for generating hydrogen sulfide comprises a hydrogen sulfide generating system including tank means for providing kraft green liquor, acid supply means for providing a supply of acid to said kraft green liquor to generate the hydrogen sulfide, and means for supplying air to said tank means to convey a mixture of air and hydrogen sulfide from said tank means.

7. The apparatus according to claim 6, comprising means for conveying the mixture of hydrogen sulfide and air from said tank means to a flue conveying said industrial gas.

8. The apparatus according to claim 7, comprising a hydrogen sulfide/air injection system for introducing the mixture of hydrogen sulfide and air into the industrial gas.

9. The apparatus according to claim 8, wherein the hydrogen sulfide/air injection system comprises a plurality of pipes having apertures therein for discharging the mixture into the industrial gas.

10. The apparatus according to claim 8, wherein the hydrogen sulfide/air injection system comprises a plurality of air foils having apertures therein for discharging the mixture into the industrial gas.

11. The apparatus according to claim 1, wherein the scrubber is a dry scrubber.

12. The apparatus according to claim 1, wherein the scrubber is a wet scrubber.

13. An apparatus for receiving and scrubbing an industrial flue gas containing mercury with an aqueous alkali reagent, comprising:

a scrubber for scrubbing the industrial flue gas with the aqueous alkali reagent;

flue means for conveying the industrial flue gas to the scrubber;

means for generating hydrogen sulfide including a tank means for providing an aqueious solution comprising sodium sulfide or an aqueous solution comprising potassium sulfide, and alkali supply means for providing an alkali to the solutions, an acid supply means for providing acid into the aqueous solution to generate hydrogen sulfide and means for supplying air to said tank means to produce a mixture of air and hydrogen sulfide; and means for supplying the hydrogen sulfide into the industrial flue gas conveyed by the flue means.

14. The apparatus according to claim 13, comprising means for controlling at least one of the supply of acid and alkali to said solution to adjust the pH of said solution and thereby control a vapor pressure of the generated hydrogen sulfide within the tank means.

15. The apparatus according to claim 13, wherein the means for supplying the hydrogen sulfide into the industrial flue gas comprises: means for supplying air to said tank means to convey a mixture of air and hydrogen sulfide from said tank means; and at least one of a plurality of pipes and a plurality of air foils, each having apertures therein, for discharging the mixture of hydrogen sulfide and air into the flue conveying the industrial flue gas.

16. The apparatus according to claim 13, wherein the hydrogen sulfide generating means comprises tank means for providing kraft green liquor, acid supply means for providing a supply of acid to said kraft green liquor to generate the hydrogen sulfide; and alkali supply means for providing a supply of alkali to said kraft green liquor.

17. The apparatus according to claim 16, comprising means for controlling at least one of the supply of acid and alkali to said kraft green liquor to adjust the pH of the kraft green liquor and thereby control a vapor pressure of the generated hydrogen sulfide within the tank means.

18. The apparatus according to claim 13, wherein the scrubber is a dry scrubber.

19. The apparatus according to claim 13, wherein the scrubber is a wet scrubber.

* * * * *